United States Patent [19]

Siong et al.

[11] Patent Number: 6,028,632
[45] Date of Patent: *Feb. 22, 2000

[54] MANAGEMENT OF MULTIPLE BUFFERS AND VIDEO DECODERS IN PROGRESSIVE DIGITAL VIDEO DECODER

[75] Inventors: Khor Chee Siong; Tan Thiow Keng, both of Singapore, Singapore

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/886,523

[22] Filed: Jul. 1, 1997

[30] Foreign Application Priority Data

Jul. 4, 1996 [JP] Japan ..................................... 8-175092

[51] Int. Cl.[7] ....................................................... H04N 7/12
[52] U.S. Cl. ........................................... 348/385; 382/234
[58] Field of Search ..................................... 348/397, 398, 348/390, 409, 411, 423, 416, 385, 24, 386–388; 382/233, 234, 235

[56] References Cited

U.S. PATENT DOCUMENTS

| | | | |
|---|---|---|---|
| 5,216,503 | 6/1993 | Paik et al. | 348/385 |
| 5,469,214 | 11/1995 | Bazzaz | 348/416 |
| 5,485,215 | 1/1996 | Meyer et al. | 348/423 |
| 5,612,742 | 3/1997 | Krause et al. | 348/385 |
| 5,633,683 | 5/1997 | Rosengren et al. | 348/385 |
| 5,640,210 | 6/1997 | Knee et al. | 348/390 |
| 5,809,176 | 9/1998 | Yajima | 382/247 |

*Primary Examiner*—Vu Le
*Attorney, Agent, or Firm*—Ratner & Prestia

[57] ABSTRACT

A progressive (non-interlaced) video decoding system has a memory for buffering a video bitstream received from a transmission channel and a transferring device for multiplexing and transferring the video bitstream to multiple video decoders and display buffers. A demultiplexer coupled to the display buffers de-multiplexes the video for display. A controller controls the multiplexing and demultiplexing operation.

11 Claims, 4 Drawing Sheets

Fig. 3

| PICTURE TYPE | I | B | P | B | B | P | B | B | P | B | B | I | B | B | P |
|---|---|---|---|---|---|---|---|---|---|---|---|---|---|---|---|
| PICTURE ORDER | 0 | 1 | 2 | 3 | 4 | 5 | 6 | 7 | 8 | 9 | 10 | 11 | 12 | 13 | 14 | 15 |

Fig. 4

| PICTURE TYPE | I | P | B | B | P | B | B | P | B | B | I | B | B | P | B | B |
|---|---|---|---|---|---|---|---|---|---|---|---|---|---|---|---|---|
| PICTURE ORDER | 0 | 3 | 1 | 2 | 6 | 4 | 5 | 9 | 7 | 8 | 12 | 10 | 11 | 15 | 13 | 14 |

MANAGEMENT OF MULTIPLE BUFFERS AND VIDEO DECODERS IN PROGRESSIVE DIGITAL VIDEO DECODER

BACKGROUND OF THE INVENTION

1. Field of the Invention

The present invention relates to a compressed video decoding apparatus which is capable of decoding video bitstream containing progressive (non-interlaced) pictures which are different from the existing interlace pictures a television system.

2. Related art of the Invention

The current existing television systems in the world are NTSC, PAL and SECAM. All this systems are interlace display system which can be annoying at times and also weakens the human eyes. Some manufacturers had tried to resolve this by using double line scan. In double line scan, each line of the picture is scanned twice to produce a flicker free output. However, this only solves half the problem. This is because the artifacts such as 'steps' appear at the edge of pictures, giving the appearance that the picture is blocky. During the last few years, there have been attempts by some broadcasters and manufacturers to rectify these problems by proposing a new television standard called the High Definition Television Standard (HDTV). However, high costs and complexity in both the receiver and broadcasting equipment discourage most consumers and broadcasters. As a result wide acceptance in the real world had not been very successful.

Recently, the Moving Pictures Expert Group (MPEG) had defined a new video compression Called the MPEG2 which is capable of compressing pictures upto 200 times and therefore open the path for digital broadcasting. However, MPEG2 video compression chips that were delivered as a result of this standard mostly use only Main Profile at Main Level (MP@ML) and display the standard interlace output. This therefore does not completely solve the problems mention above as there is no improvement in either picture resolution nor display rate.

Current existing standard systems can only display interlace output. This type of flickering display can be rather annoying to users and damaging to the eyes. In addition the resolution is low and interfacing to computer graphics which is generally of high resolutions is unsatisfactory. Current analog transmission system is also lower in quality and reliability compared with digital transmission. However, digital transmission bandwidth requirement is enormous and some compression is required. HDTV systems which can solve most of the above problems are too high in cost for both broadcasters and consumers.

SUMMARY OF INVENTION

A system has been invented which is capable of decoding progressive video bitstream compressed according to the MPEG2 standard. The system is capable of displaying progressive pictures flicker free and with little artifacts. The system also provides a higher resolution compared to existing standard system. In addition, interfacing to and displaying computer graphics is easier and results in higher quality output. More importantly, it is expected to cost much less than a HDTV system, both for broadcasters and consumers.

That is a system had been invented which is capable of decoding progressive video bitstream compressed according to the MPEG2 standard. The system is capable of displaying at a progressive output of 60 Hz for NTSC system with a resolution of 720×480 per frame of picture. With the number of horizontal scanning lines increased per vertical scan, the pictures appear sharper than interlace. More importantly, the pictures are now flicker free with no drop in picture quality. In addition, interfacing to computer images and graphics can be done more easily as most computer images are non-interlaced and those annoying single line flicker is removed.

Estimated cost of the progressive decoding system is about only 10–15% of the current high end television system. Broadcasting equipment for a progressive decoding system is also expected to only cost about 10–15% more than current broadcasting equipment. This is significantly lower than HDTV which currently can easily cost twice as much more for either receiver or transmitter.

For the purpose of solving the above-described problems, a progressive video MPEG2 decoder according to the present invention comprises means for input transmission buffering a video bitstream to the multiple video decoders, means for controlling the decoding process of each of the multiple video decoders and means for controlling the display buffers of each of the multiple video decoders and demultiplexing the display output of each of the said display buffers.

By the above described configuration, the present invention is a system that is capable of receiving MPEG2 compressed progressive video bitstream from a transmission channel, decoding and reconstructing the pictures from the said video bitstream, transferring the reconstructed pictures into display buffers and finally output the display buffers pictures into a progressive monitor. The present invention can be used either as a broadcast decoder receiver or as the decoder in a disc system.

BRIEF DESCRIPTION OF THE DRAWINGS

FIG. 3 illustrates the picture type and display order in typical sequence of display, FIG. 4 illustrates the picture type and display order in an encoded video bitstream corresponding to the display order shown in FIG. 3.

PREFERRED EMBODIMENTS

With reference to the drawings, a brief explanation on MPEG2 syntax and bitstream will be explained hereinafter. The MPEG2 bitstream has video syntax which corresponds to a hierarchical structure. A "sequence" is the top layer of the video coding hierarchy and consists of a header and some "Group Of Pictures"(GOPS). The sequence header initializes a decoder. A GOP consists of a header and a number of pictures. Each GOP usually has one I-pictures, some B-pictures and some P-picture. The I-picture, B-picture and P-picture also have header codes indicating picture type. I-pictures are intra-coded, i.e., they are compressed using only information from within the picture itself. P-pictures are coded from a previous P-picture or I-picture and from within the picture itself. B-pictures are bidirectionally-coded pictures, which means that B-pictures are coded from previous I-picture or P-picture and from the future P-picture. Because of picture dependencies, the pictures in the compressed video bitstream is not in display order. For example, as shown in FIG. 3 are the normal display order of a group of pictures. Coaparing this with the picture order as shown in a video bitstream in FIG. 4, it is shown that the B-pictures is dependent on I-picture or P-picture and therefore I-picture and P-picture must be transmitted and decoded before the B-picture.

Figure 1:
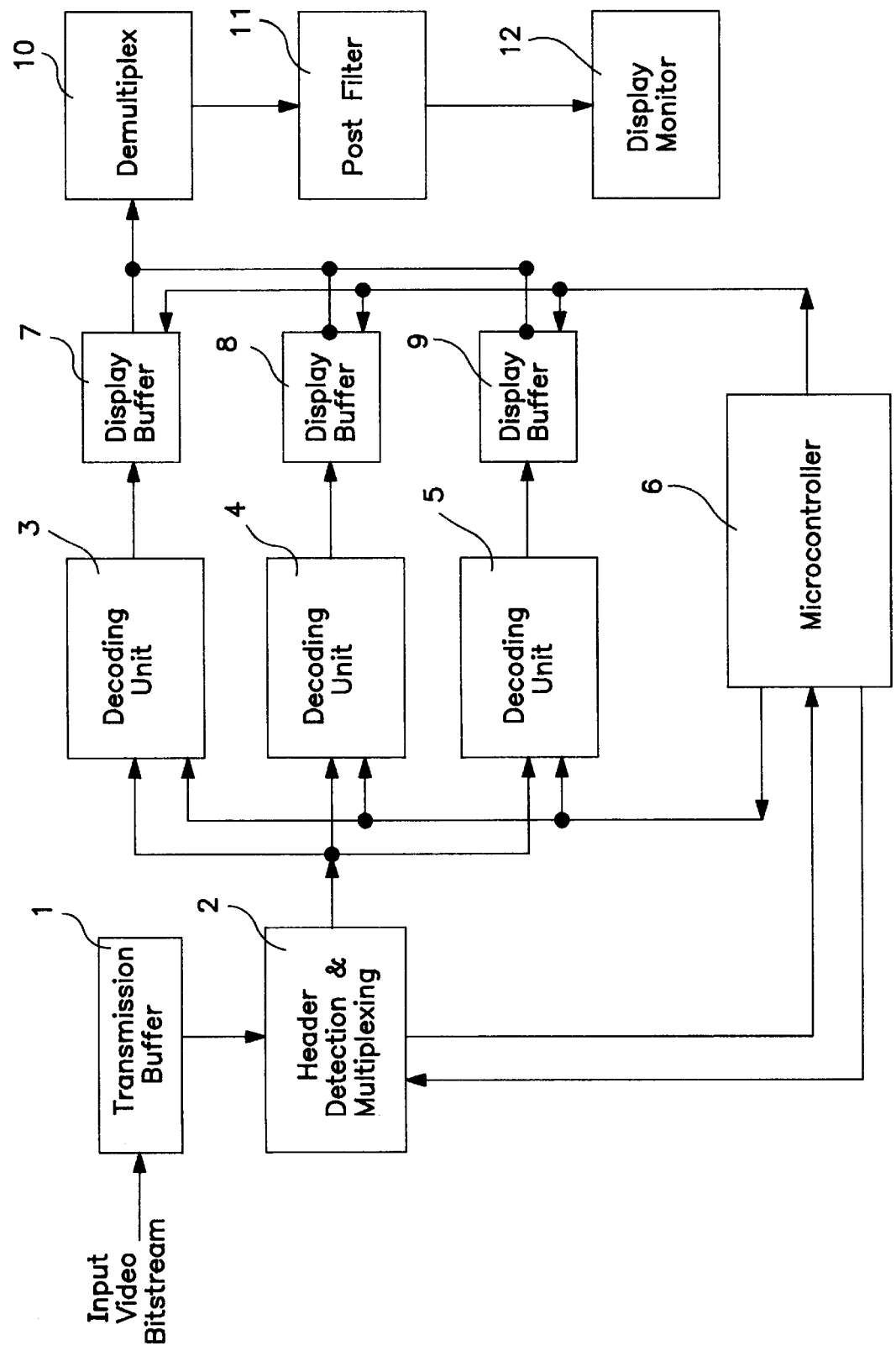
FIG. 1 is a block diagram of a novel buffers and interlace video decoder management scheme in one embodiment according to the present invention.
Figure 2:
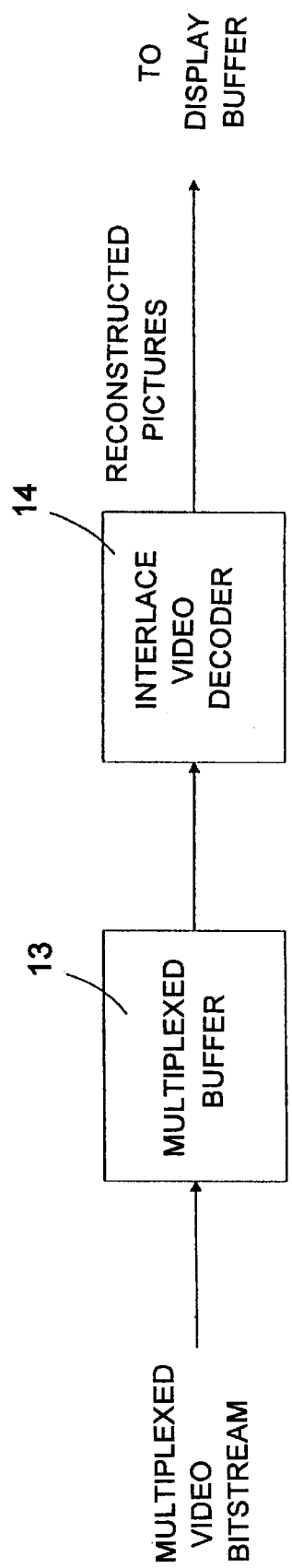
FIG. 2 is a block diagram showing one example of the internal arrangement of the decoding units in FIG. 1.

The operation of each of the decoding unit 3,4,5 as shown in FIG. 1 and FIG. 2 will be explained hereinafter. Each decoding unit 3,4,5 requires one GOP plus the first four pictures from the next GOP. The reason is due to the fact that each of the decoding units operates in a pipeline manner but independent of each other. To further explain the reason, observe what has been explained earlier in the video syntax of MPEG, where I-picture and P-picture must always precede the B-picture. However, in the normal GOP other than the first GOP of a sequence, the picture order in the bitstream is usually in the order below.

| Previous GOP | current GOP | next GOP |
|---|---|---|
| IBBPBBPBBP | IBBPBBPBBP | IBBPBBPBBP |

Hence the first two B frames of the current GOP to be decoded by the decoder unit, example, 4, must be removed. However, this causes a loss of two frames which is unacceptable. To rectify this, the decoder unit 3 that decodes the GOP preceding the current GOP will decode the IBBP pictures of the current GOP while decoding unit 4 will decode the IBBP of the next GOP. Therefore, no pictures are lost and each decoding unit 3,4,5 remains independent.

With reference to the drawings in FIG. 1 and FIG. 2, an embodiment of the management of the buffers and video decoders will be explained hereinafter. Whenever an input video bitstream is received from a transmission channel, the transmission buffer 1 will buffer the bitstream until the header detection unit 2 is ready to process the bitstream. The header detection reads the bitstream from the transmission buffer 1 at a rate that is much faster than the input rate into the transmission buffer 1. This ensures that the transmission buffer will not overflow. The header detection 2 has a comparator to compare the input bitstream with the required header to be detected, which is provided by the micro-controller 6. The micro-controller 6 controls the header detection 2 by loading the header code to be detected into the comparator. By loading the header code to be detected, the micro-controller 6 can detect the start and end of a GOP and also the picture type in the video bitstream coming from the transmission channel. Therefore, the micro-controller 6 is able to cut up the bitstream into three portions as shown in FIG. 1 and controls multiplexer 2 which multiplexes and feeds the video bitstream into the independent decoder units 3,4,5 as shown.

FIG. 2 shows the internal block diagram of the decoding units 3,4,5. When decoding units 3,4,5 receives the multiplexed video bitstream from the multiplexer 2, the bitstream is stored in the multiplexed buffer 13 of each of the decoding units 3,4,5 as shown in FIG. 2. The decoding units 3,4,5 then wait for the start signal from the micro-controller 6 to activate the interlace video decoder 14 and hence the decoding process. The micro-controller 6 activates the interlace video decoder 14 when the multiplexed buffer 13 has enough bitstream data for the decoding process. During the decoding process, the interlace video decoder 14 reads the bitstream from the multiplexed buffer and outputs the reconstructed pictures into the respective display buffer 7,8,9 connecting independently to each of the decoding units 3,4,5. The interlace video decoder 14 stops decoding when the multiplexed buffer 13 is almost empty. Usually this also indicates that one GOP of bitstream has been read out from the multiplexed buffer 13 and had been decoded by the interlace video decoder 14. Once the interlace video decoder 14 stops decoding, it can be activated again only by the micro-controller 6. Therefore the micro-controller 6 can control the decoding period and sequence of the decoding units 4,5,6 in a pipeline manner and thus ensure that the input bitstream is decoded in synchronization with the bit rate, i.e., no underflow or overflow will occur.

The micro-controller 6 controls the output of the display buffers 7,8,9. At anytime, only one of the display buffers 7,8,9 will be selected for reconstructed picture output to be sent to the de-multiplex unit 10. The display buffers 7,8,9 will be rotational selected by the micro-controller 6 to ensure a seamless output at the display monitor 12. The post filter 11 interpolates the chrominance video data to generate a 720×480 display output. Because of the post filtering, some buffering at the post filter 11 is required to delay for the luminance reconstructed video data. The reconstructed and post filtered picture data is then synchronized with the video sync and finally converted to analog for display on the display monitor 12.

Figure 5:
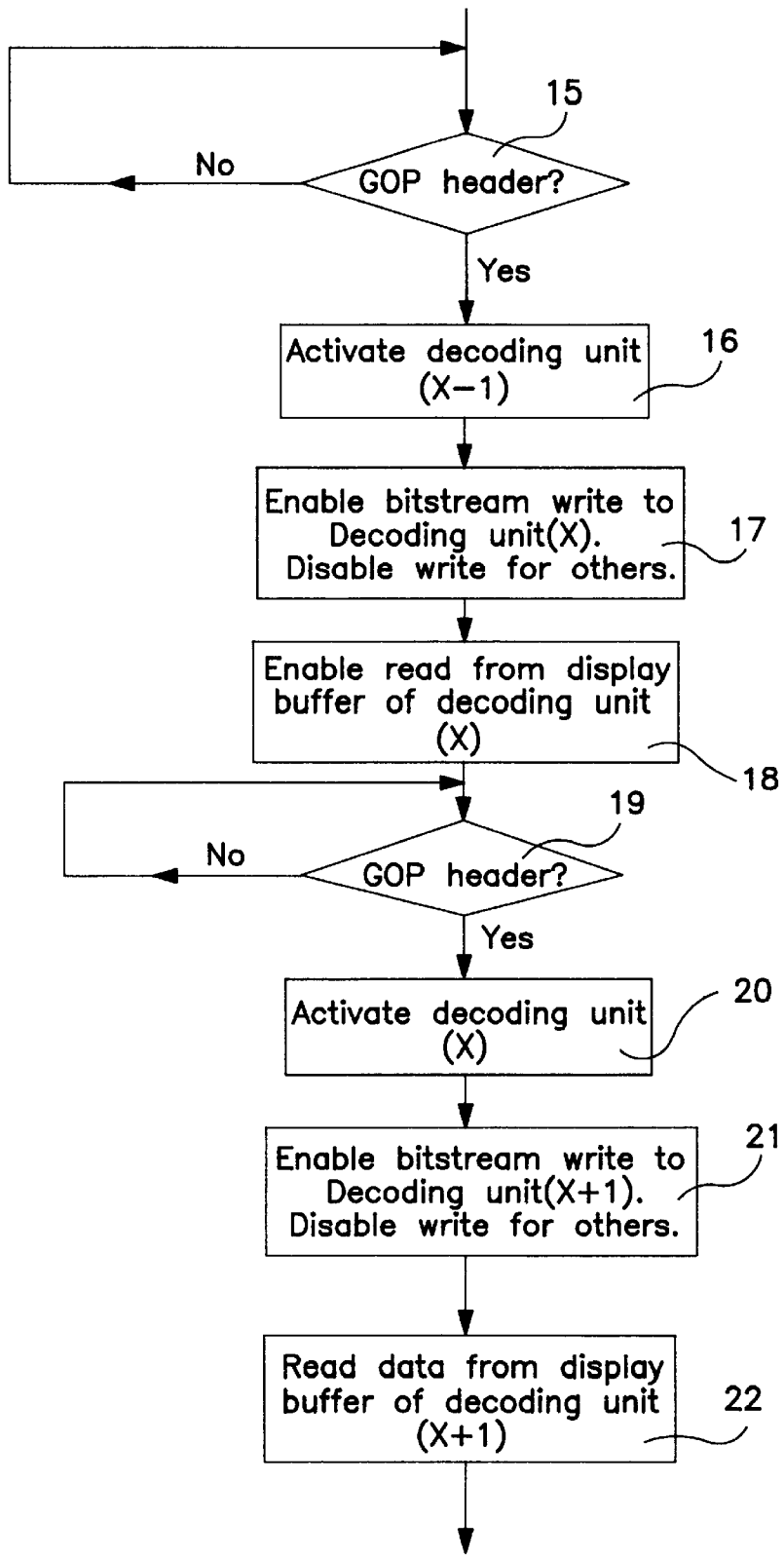
FIG. 5 shows the flow diagram of the micro-controller processes in the management scheme of buffers and interlace video decoders for a progressive video decoder system in one embodiment according to the present invention.

FIG. 5 shows the flow diagram of the micro-controller 6 processes in the management scheme of buffers and interlace video decoders for a progressive video decoder system. Starting from typical process flow in the micro-controller 6 at 15, where the header detection unit 2 checks for the GOP header. For simplification purpose and prevent repetitive drawings, the typical decoding unit is labeled as X.

This is because the micro-controller 6 will rotate the controls through all the decoding units 3,4,5 and the operations are the same. Once the GOP header is detected, the decoding unit(X−1) which had bitstream written to it previously is activated(step 16). At the same time, as in step 17 the decoding unit (X) which has just completed decoding will have its multiplexed buffer 13 enable for bitstream input. Also, as in step 18, display buffer connected to decoding unit (X) is enable and the data read out to the de-multiplexer 10. The control process then repeat itself but the decoding unit affected is (X) as in step 20, and (X+1) as in steps 21 and 22.

As mentioned above the present invention for a progressive video decoder enables multiple interlace video decoders to run in a pipeline manner to achieve the bandwidth and timing required to decode progressive video bitstream received from a transmission channel and display as a non-interlace flicker free video output. Input video bitstream upto 100M bits/s can be received by this buffering and control management technique. The GOP headers in the received video bitstream is tagged and the subsequent bitstream following the GOP headers is then multiplexed to the interlace video decoders which are running in a pipeline manner. Picture decoding, reconstructing, and display operations are synchronized to permit the transfer of data from the input buffer to the interlace video decoders and from the interlace video decoders to the display buffers seamlessly, and without causing either underflow or overflow problem in any of the interlace video decoders. A micro-controller regulates and controls the operation of data transfers, intensive and high speed processing, video decoders activity and synchronizing in the progressive decoder system. As apparent from the above described explanation, by a novel management of buffers and interlace video decoders, a MPEG2 video decoding receiver, that can decode at more than twice processing power than that of a normal interlace MPEG2 decoder and therefore capable of decoding progressive video bitstream and displaying on a progressive video monitor is invented.

What is claimed is:

1. A progressive video decoding system comprising:

buffering means for buffering a video bitstream received from a transmission channel;

transferring means, coupled to said buffering means, for multiplexing and transferring said video bitstream to a plurality of video decoders, each of said video decoders having a respective display buffer of a plurality of display buffers;

controlling means, coupled to said transferring means and said display buffers, for controlling a decoding process of each of said video decoders and for controlling said display buffers to produce a display output; and demultiplexing means, coupled to said display buffers, for demultiplexing the display output of each of said display buffers;

wherein said transferring means includes header detection means for identifying coded header data in said video bitstream and determining which of said video decoders said video bitstream is to be transferred to.

2. A progressive video decoding system as defined in claim 1 wherein said controlling means includes a microcontroller.

3. A progressive video decoding system comprising:

buffering means for buffering a video bitstream received from a transmission channel;

transferring means, coupled to said buffering means, for multiplexing and transferring said video bitstream to a plurality of video decoders, each of said video decoders having a respective display buffer of a plurality of display buffers;

controlling means, coupled to said transferring means and said display buffers, for controlling a decoding process of each of said video decoders and for controlling said display buffers to produce a display output;

demultiplexing means, coupled to said display buffers, for demultiplexing the display output of each of said display buffers; and a plurality of input multiplexed buffers, each coupled to a respective video decoder, wherein said transferring means includes means for storing said multiplexed video bitstream into said input multiplexed buffers.

4. A progressive video decoding system as defined in claim 3 wherein said means for storing includes means for determining when said multiplexed video bitstream has been received by said input multiplexed buffers.

5. A progressive video decoding system as defined in claim 3 wherein said controlling means includes a microcontroller.

6. A progressive video decoding system comprising:

buffering means for buffering a video bitstream received from a transmission channel;

transferring means, coupled to said buffering means, for multiplexing and transferring said video bitstream to a plurality of video decoders, each of said video decoders having a respective display buffer of a plurality of display buffers;

controlling means, coupled to said transferring means and said display buffers, for controlling a decoding process of each of said video decoders and for controlling said display buffers to produce a display output; and demultiplexing means, coupled to said display buffers, for demultiplexing the display output of each of said display buffers, wherein said controlling means includes determining means for determining the starting and stopping of the decoding process of each of said video decoders.

7. A progressive video decoding system comprising:

buffering means for buffering a video bitstream received from a transmission channel;

transferring means, coupled to said buffering means, for multiplexing and transferring said video bitstream to a plurality of video decoders, each of said video decoders having a respective display buffer of a plurality of display buffers;

controlling means, coupled to said transferring means and said display buffers, for controlling a decoding process of each of said video decoders and for controlling said display buffers to produce a display output; and demultiplexing means, coupled to said display buffers, for demultiplexing the display output of each of said display buffers, wherein said de-multiplexing means includes display controlling means for controlling each of the display buffers.

8. A progressive video decoding system as defined in claim 7 wherein said display controlling means includes means for determining the start and stop of storing process into the display buffer and the start and stop process of transferring to a display output device.

9. A process of pipeline decoding a video bitstream of a sequence of group of pictures (GOPs), each GOP having a header and a plurality of picture types, and the sequence having a previous GOP, a current GOP and a next GOP in time succession, comprising the steps of:

transferring the previous GOP and a first portion of consecutive picture types of the current GOP into a first decoder unit, said first portion immediately following the previous GOP in time, transferring the current GOP and a second portion of consecutive picture types of the next GOP into a second decoder unit, said second portion immediately following the current GOP in time, detecting the header of each GOP to identify which of said decoder units to transfer the video bitstream, decoding contents of the first and second decoder units independently of each other in time succession after completion of the respective transferring, and reconstructing the contents of the first and second decoder units independently of each other in time succession.

10. A progressive video decoding system comprising:

buffering means for buffering a video bitstream of a sequence of group of pictures (GOPs), each GOP having a header and a plurality of picture types received from a transmission channel;

transferring means, coupled to said buffering means, for multiplexing and transferring said video bitstream to a plurality of video decoders, each of said video decoders decoding said video bitstream independently of the other video decoders; and demultiplexing means, coupled to said decoders for demultiplexing a decoded output of each of said decoders, wherein said transferring means includes header detection means for identifying coded header data in said video bitstream and determining which of said video decoders said video bitstream is to be transferred to.

11. The progressive video decoding system of claim 10, wherein one GOP and a portion of picture types of the next GOP in said sequence is sequentially transferred to each of said video decoders and each display output is de-multiplexed after said transfer is completed.

* * * * *